US 11,755,015 B2

United States Patent
Beijbom et al.

(10) Patent No.: US 11,755,015 B2
(45) Date of Patent: *Sep. 12, 2023

(54) SCORING AUTONOMOUS VEHICLE TRAJECTORIES USING REASONABLE CROWD DATA

(71) Applicant: Motional AD LLC, Boston, MA (US)

(72) Inventors: Oscar Olof Beijbom, Santa Monica, CA (US); Bassam Helou, Santa Monica, CA (US); Radboud Duintjer Tebbens, Winchester, MA (US); Calin Belta, Sherborn, MA (US); Anne Collin, Cambridge, MA (US); Tichakorn Wongpiromsarn, Ames, IA (US)

(73) Assignee: Motional AD LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/555,941

(22) Filed: Dec. 20, 2021

(65) Prior Publication Data

US 2022/0204033 A1 Jun. 30, 2022

Related U.S. Application Data

(63) Continuation of application No. 17/336,685, filed on Jun. 2, 2021, now Pat. No. 11,203,362, which is a
(Continued)

(51) Int. Cl.
*G06N 3/08* (2023.01)
*G05D 1/00* (2006.01)
(Continued)

(52) U.S. Cl.
CPC ....... *G05D 1/0088* (2013.01); *B60W 60/0011* (2020.02); *G01C 21/3407* (2013.01);
(Continued)

(58) Field of Classification Search
CPC ............... G05D 1/0088; G05D 1/0212; G05D 2201/0213; G05D 1/0221; B60W 60/0011;
(Continued)

(56) References Cited

U.S. PATENT DOCUMENTS

| | | |
|---|---|---|
| 11,203,362 B1 | 12/2021 | Beijbom et al. |
| 2018/0292222 A1 | 10/2018 | Lin et al. |

(Continued)

FOREIGN PATENT DOCUMENTS

| | | |
|---|---|---|
| DE | 102018133576 | 7/2019 |
| DE | 102019113114 | 12/2019 |

(Continued)

OTHER PUBLICATIONS

[No Author Listed], "SAE: International Surface Vehicle Recommended Practice," J3016, Sep. 30, 2016, 30 pages.
(Continued)

*Primary Examiner* — Charlotte M Baker
(74) *Attorney, Agent, or Firm* — Fish & Richardson P.C.

(57) ABSTRACT

Enclosed are embodiments for scoring one or more trajectories of a vehicle through a given traffic scenario using a machine learning model that predicts reasonableness scores for the trajectories. In an embodiment, human annotators, referred to as a "reasonable crowd," are presented with renderings of two or more vehicle trajectories traversing through the same or different traffic scenarios. The annotators are asked to indicate their preference for one trajectory over the other(s). Inputs collected from the human annotators are used to train the machine learning model to predict reasonableness scores for one or more trajectories for a given traffic scenario. These predicted trajectories can be used to rank trajectories generated by a route planner based on their scores, compare AV software stacks, or used by any
(Continued)

other application that could benefit from a machine learning model that scores vehicle trajectories.

21 Claims, 11 Drawing Sheets

Related U.S. Application Data continuation of application No. 17/009,656, filed on Sep. 1, 2020.

(51) Int. Cl.
| | | |
|---|---|---|
| *B60W 60/00* | (2020.01) | |
| *G01C 21/36* | (2006.01) | |
| *G01C 21/34* | (2006.01) | |
| *G05D 1/02* | (2020.01) | |
| *G06V 20/40* | (2022.01) | |
| *G06V 20/56* | (2022.01) | |
| *G06F 18/21* | (2023.01) | |
| *G06F 18/214* | (2023.01) | |
| *G06F 18/2415* | (2023.01) | |
| *G06N 5/01* | (2023.01) | |
| *G06V 10/82* | (2022.01) | |
| *G06V 20/54* | (2022.01) | |

(52) U.S. Cl.
CPC ....... *G01C 21/3691* (2013.01); *G05D 1/0212* (2013.01); *G06F 18/217* (2023.01); *G06F 18/2148* (2023.01); *G06F 18/2415* (2023.01); *G06N 3/08* (2013.01); *G06N 5/01* (2023.01); *G06V 10/82* (2022.01); *G06V 20/41* (2022.01); *G06V 20/54* (2022.01); *G06V 20/56* (2022.01); *B60W 2552/00* (2020.02)

(58) Field of Classification Search
CPC ........... B60W 2552/00; B60W 30/095; B60W 20/12; B60W 30/10; B60W 50/0097; B60W 60/0027; G01C 21/3407; G01C 21/3691; G01C 21/3484; G01C 21/3492; G06F 18/2148; G06F 18/217; G06F 18/2415; G06N 3/08; G06N 5/01; G06N 3/045; G06N 3/042; G06N 20/10; G06N 5/02; G06N 20/00; G06V 10/82; G06V 20/41; G06V 20/54; G06V 20/56; G06Q 10/06393; G06Q 50/30; G06T 19/00
USPC ........................................................ 382/159
See application file for complete search history.

(56) References Cited

U.S. PATENT DOCUMENTS

| | | |
|---|---|---|
| 2019/0033085 A1 | 1/2019 | Ogale et al. |
| 2019/0034794 A1 | 1/2019 | Ogale et al. |
| 2019/0243371 A1* | 8/2019 | Nister ............. G05D 1/0242 |
| 2020/0150671 A1 | 5/2020 | Fan et al. |
| 2020/0272854 A1 | 8/2020 | Caesar |
| 2022/0063666 A1 | 3/2022 | Beijbom et al. |

FOREIGN PATENT DOCUMENTS

| | | |
|---|---|---|
| DE | 102018116036 | 1/2020 |
| WO | WO 2019023628 | 1/2019 |

OTHER PUBLICATIONS

Censi et al., "Liability, Ethics, and Culture Aware Behavior Specification using Rulebooks," 2019 International Conference on Robotics and Automation (ICRA), May 20-24, 2019, 8536-8542.

Gao et al., "VectorNet: Encoding HD Maps and Agent Dynamics from Vectorized Representation," In Proceedings of the IEEE/CVF Conference on Computer Vision and Pattern Recognition, May 8, 2020, 9 pages.

He et al., "Deep residual learning for image recognition," 2016 IEEE Conference on Computer Vision and Pattern Recognition (CVPR), Jun. 27-30, 2016, 770-778.

Shah et al., "Stochastically Transitive Models for Pairwise Comparisons: Statistical and Computational Issues," Proceedings of the 33rd International Conference on Machine Learning, New York, NY, Jun. 11, 2016, 10 pages.

Simonyan et al., "Very Deep Convolutional Networks for Large-Scale Image Recognition," ICLR, Sep. 4, 2014, 1-14.

\* cited by examiner

SCORING AUTONOMOUS VEHICLE TRAJECTORIES USING REASONABLE CROWD DATA

CROSS-REFERENCE TO RELATED APPLICATION

This application is a continuation of and claims priority to U.S. patent application Ser. No. 17/336,685, filed Jun. 2, 2021, now pending, which is a continuation of and claims priority to U.S. patent application Ser. No. 17/009,656, filed Sep. 1, 2020, now pending, the entire contents of which are incorporated herein by reference.

FIELD OF THE INVENTION

The description that follows relates generally to scoring trajectories for autonomous vehicles and/or other objects.

BACKGROUND

When confronted with a traffic scenario, an autonomous vehicle (AV) software stack may plan one or more trajectories that comply with a set of rules embodied in a rulebook, such as avoiding collisions, obeying traffic laws and providing a comfortable ride for passengers. Different AV software stacks can generate different trajectories, each of which complies with the rulebook. In some cases, it may be desirable to have an interpretable way of scoring a trajectory from among a plurality of candidate trajectories for a given traffic scenario.

SUMMARY

Techniques are provided for using a machine learning model to score two or more trajectories associated with the same or a different traffic scenario, where the machine learning model is trained using data collected from a plurality of human annotators observing computer simulations of the trajectories, referred to herein as reasonable crowd data.

In an embodiment, a method comprises: generating, using one or more processors, a set of trajectories for a vehicle operating in an environment, each trajectory in the set of trajectories associated with a traffic scenario; predicting, using the one or more processors, a reasonableness score for each trajectory in the set of trajectories, wherein the reasonableness score is obtained from a machine learning model that is trained using input obtained from a plurality of human annotators, and a loss function that penalizes predictions of reasonableness scores that violate a rulebook structure; augmenting, using the one or more processors, a route planner of the vehicle using the predicted reasonableness scores for the trajectories; planning, using the one or more processors, a trajectory in the environment using the augmented route planner; and operating, using a control circuit of the vehicle, the vehicle along the planned trajectory.

In an embodiment, a method comprises: obtaining, using one or more processors, a set of realizations of one or more traffic scenarios, wherein each realization includes a traffic scenario and a trajectory of a vehicle traversing the traffic scenario; converting, using the one or more processors and a rulebook, each realization into a set of scores that correspond to how well the realization adheres to different rules in the rulebook; predicting, using a machine learning model with the list of scores as input, reasonableness scores for the set of realizations; obtaining, using the one or more processors, annotations from a plurality of human annotators, the annotations indicating a reasonableness of each realization; generating, using the one or more processors, ground-truth data based at least in part on the annotations; minimizing, using the one or more processors, a loss function of the ground-truth data and predicted reasonableness scores, wherein the loss function penalizes predictions of reasonableness scores that violate the rulebook structure; and determining, using the one or more processors, parameters of the machine learning model based on an output of the minimized loss function.

In an embodiment, the loss function is a hinge or slack loss function.

In an embodiment, the machine learning model is a linear support vector machine.

In an embodiment, the machine learning model is a neural network.

In an embodiment, generating, using the machine learning model, predicted reasonableness scores for the set of realizations, further comprises: providing, as input into the neural network, pseudo-image embeddings of the set of realizations.

In an embodiment, the pseudo-image embedding is a bird's eye view (BEV) embedding.

In an embodiment, generating, using the machine learning model, predicted reasonableness scores for the set of realizations, further comprises: providing, as input into the neural network, a vector embedding for the set of realizations.

In an embodiment, the set of realizations includes the same traffic scenario.

In an embodiment, a first set of scores is input into the machine learning model, and the machine learning model predicts a first reasonableness score, and then a second set of scores is input into the machine learning model, and the machine learning model predicts a second reasonableness score.

In an embodiment, obtaining human annotations from the plurality of human annotators, further comprises: obtaining, using the one or more processors, pairs of realizations associated with a traffic scenario; rendering, using the one or more processors, the pairs of realizations; presenting, using the one or more processors, the rendered pairs of realizations to the plurality of human annotators; and obtaining, using the one or more processors, annotations for the rendered pairs of realizations from the plurality of human annotators.

In an embodiment, generating ground-truth data based at least in part on the human annotations, further comprises fitting a statistical model to the human annotations that predicts an outcome of a pair comparison.

In an embodiment, a traffic scenario includes a map populated with other agents, their starting positions and their trajectories.

In an embodiment, the rulebook includes a collection of traffic laws, rules of the road and stakeholder requirements that are translated into mathematical rules.

In an embodiment, the rulebook has a priority structure that encodes a relative importance of different rules.

In an embodiment, the set of realizations are rendered into three-dimensional (3D) videos.

In an embodiment, the human annotations indicate a preference of one realization over another realization of a pair of realizations, and the annotations are encoded with a function that outputs a value indicating that the annotator preferred a first realization of the pair over a second realization of the pair.

In an embodiment, the machine learning model is a convolutional neural network trained on images.

In an embodiment, the loss function penalizes predictions of reasonableness scores based at least in part on the rulebook's prediction of which trajectory of the pair of trajectories is preferable.

One or more of the disclosed embodiments provide one or more of the following advantages. A machine learning (ML) model is trained to predict reasonableness scores for AV trajectories for a given traffic scenario. In an embodiment, the predicted scores can be used to tune a route planner and its performance, compare two AV stacks, reinforcement learning and any other desired application.

These and other aspects, features, and implementations can be expressed as methods, apparatus, systems, components, program products, means or steps for performing a function, and in other ways.

These and other aspects, features, and implementations will become apparent from the following descriptions, including the claims.

DETAILED DESCRIPTION

Figure 1:
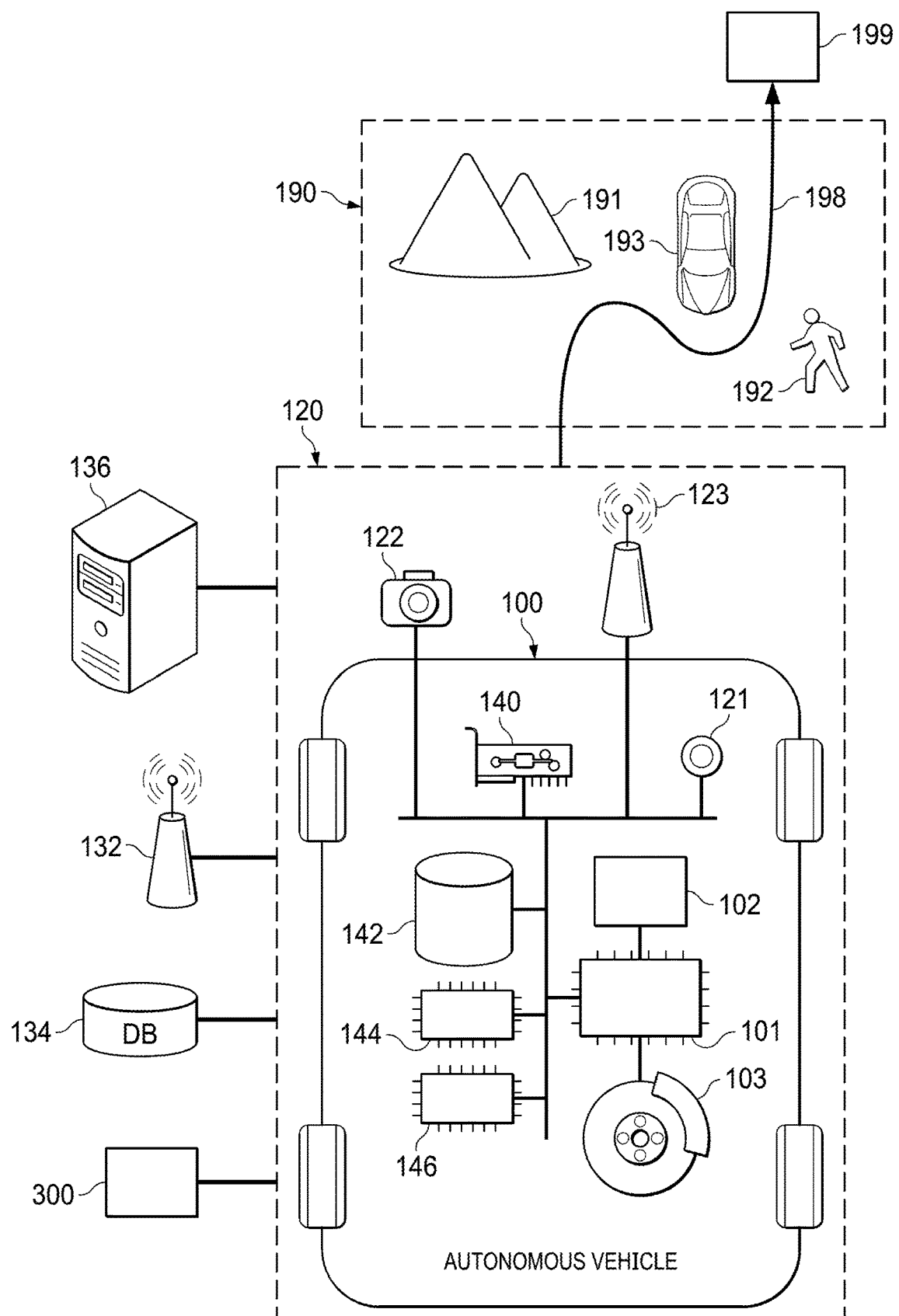
FIG. 1 shows an example of an autonomous vehicle (AV) having autonomous capability, in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Using A Machine Learning Model Trained With Reasonable Crowd Data To Score Trajectories Associated with a Traffic Scenario General Overview Techniques are provided for training and using machine learning models for scoring AV trajectories using data collected from a "reasonable crowd." An AV can traverse a given traffic scenario in different ways. Different AV route planners can choose different trajectories as the preferred way to traverse the traffic scenario. It is desired, however, to choose the "best" trajectory for an AV to traverse the traffic scenario. A "best" trajectory can be subjective but most can agree that a best trajectory is one that at least allows the AV to adhere to traffic laws, be comfortable and ethical, etc. However, even the most objective of these requirements, obeying traffic laws, is in practice ambiguous. It is also desirable to understand why a particular AV software stack chooses one trajectory over another.

The embodiments described below use an ML model that can score trajectories in an interpretable way. Human annotations determine the parameters of the ML model. To achieve interpretability, a rulebook or other model is used to break down how the AV traverses a particular traffic scenario into human-understandable components that can be formally analyzed to assign the AV trajectory a reasonableness score. The trained ML model can then be used during real-time operation of an AV to predict reasonableness scores for input pairs of trajectories for a traffic scenario that is output by, for example, a planning module (See FIG. 4). In an embodiment, the reasonableness scores can be used to decide (e.g., rank) which trajectory among multiple candidate trajectories the AV should choose to traverse a given traffic scenario, even if the candidate trajectories are equally good based solely on compliance with the rulebook, or for any other application where scoring trajectories provides benefits.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to operate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory traverses one or more map segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings or having two lanes between the lane markings. A lane could also be interpreted in the absence of lane markings. For example, a lane may be defined based on physical features of an environment, e.g., rocks and trees along a thoroughfare in a rural area.

Figure 7:
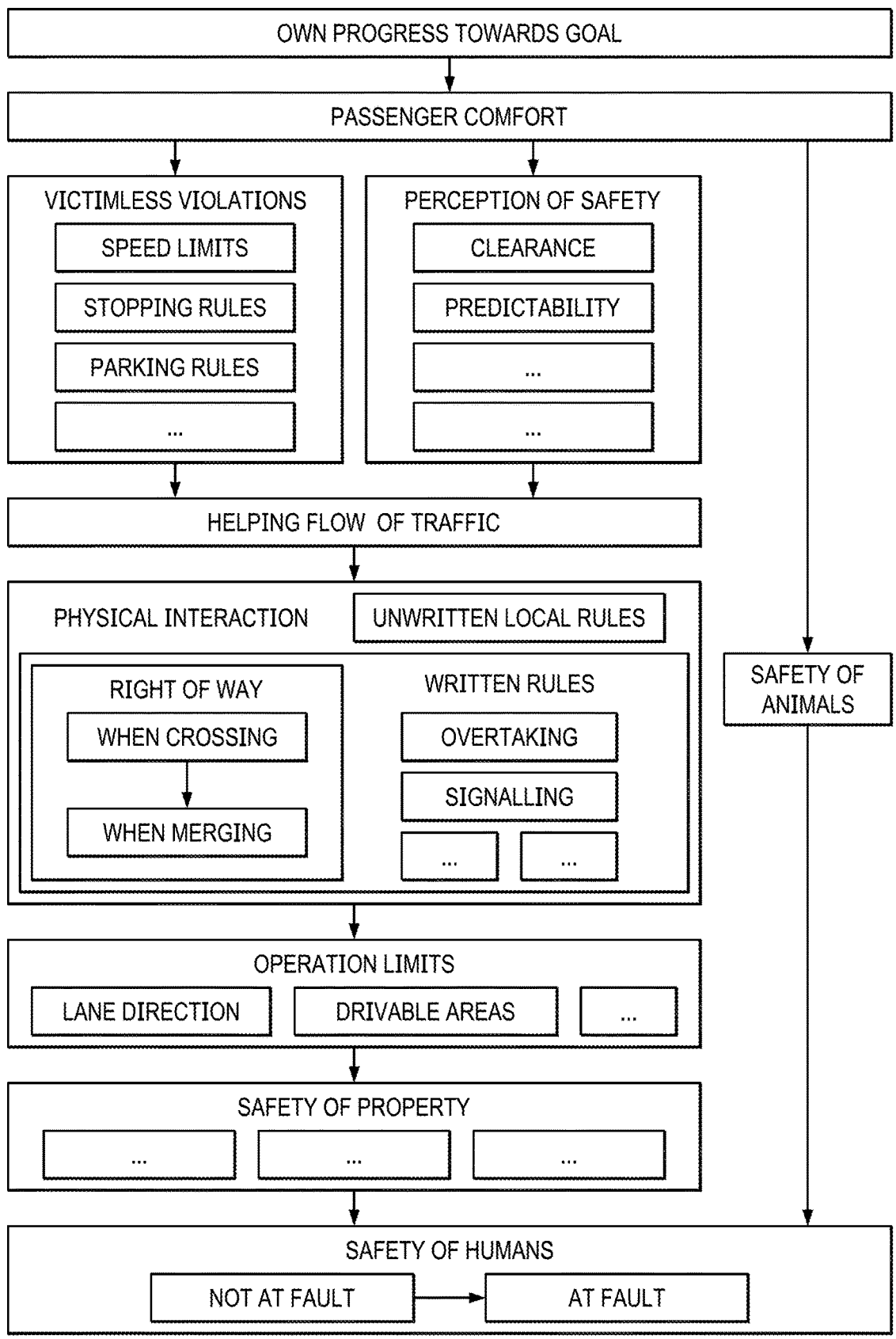
FIG. 7 is an example rulebook with a partial-ordered structure, in accordance with one or more embodiments.

As used herein, a "rulebook" is a collection of traffic laws, rules of the road and stakeholder requirements that are translated into precise mathematical rules. A rulebook can have a priority structure that encodes a belief about the relative importance of different rules. An example rulebook with partial ordering is shown in FIG. 7. In this example, the safety of humans is prioritized over violating parking rules, and parking rules and stopping rules are of similar importance, where priority decreases from top to bottom. This priority structure can rank some trajectories (e.g., one in which a pedestrian is hit, and one in which the AV is parked illegally), but not all (e.g., such as one where a parked car is hit, and another trajectory where an animal is hit). Further detail regarding rulebooks can be found in Censi et al. Liability, Ethics, and Culture-Aware Behavior Specification using Rulebooks (https://arxiv.org/abs/1902.09355).

As used herein, a "realization" includes a traffic scenario and an AV's trajectory through the traffic scenario.

As used herein, a "traffic scenario" is a map populated with agents, their starting position and their trajectories.

As used herein, a "machine learning model" includes any model that is trained on data to make predictions, including without limitation: artificial neural networks, support vector machines, decision trees, regression analysis, Bayesian networks and genetic algorithms.

As used herein, "reasonable crowd data" includes data collected from a plurality of human annotators while they observe computer simulations of two or more trajectories through a give traffic scenario.

As used herein, "reasonableness score" is a score predicted by a ML model trained on "reasonable crowd data."

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "includes," and/or "including," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear velocity and acceleration, angular velocity and acceleration, and heading (e.g., an orientation of the leading end of AV 100). Example of sensors 121 are GNSS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Example Cloud Computing Environment

Figure 2:
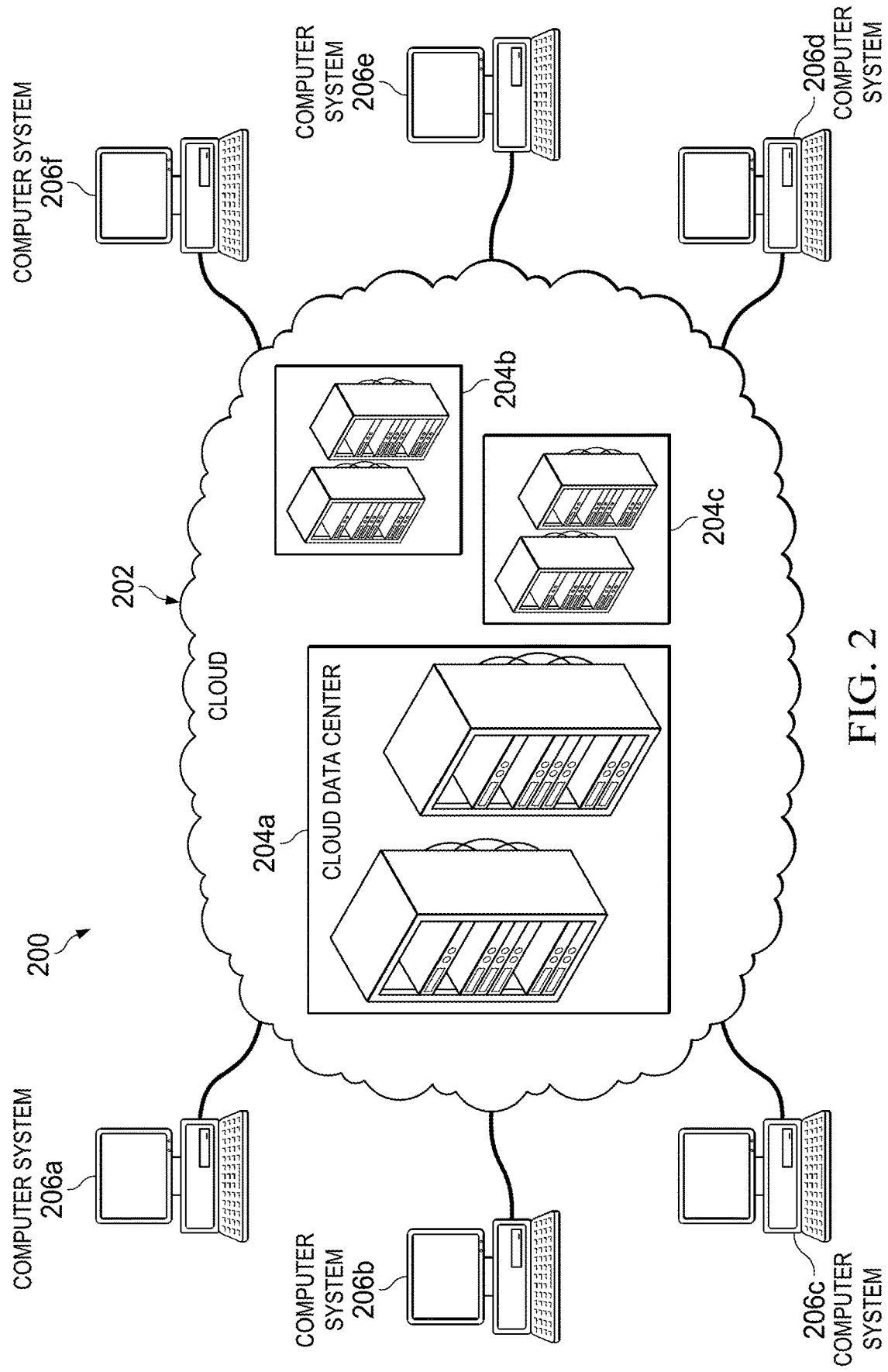
FIG. 2 illustrates an example "cloud" computing environment, in accordance with one or more embodiments.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Computer System

Figure 3:
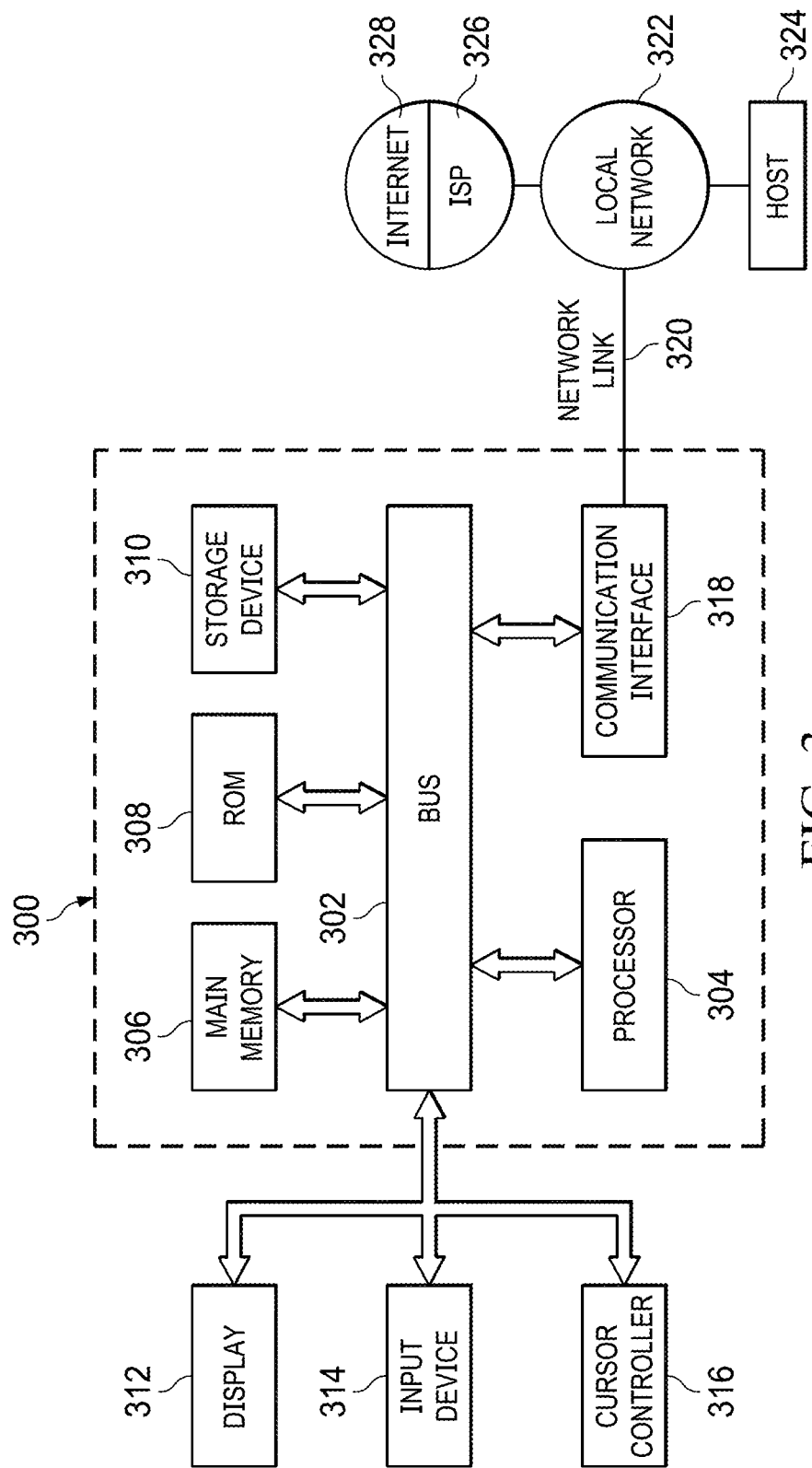
FIG. 3 illustrates a computer system, in accordance with one or more embodiments.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that include the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
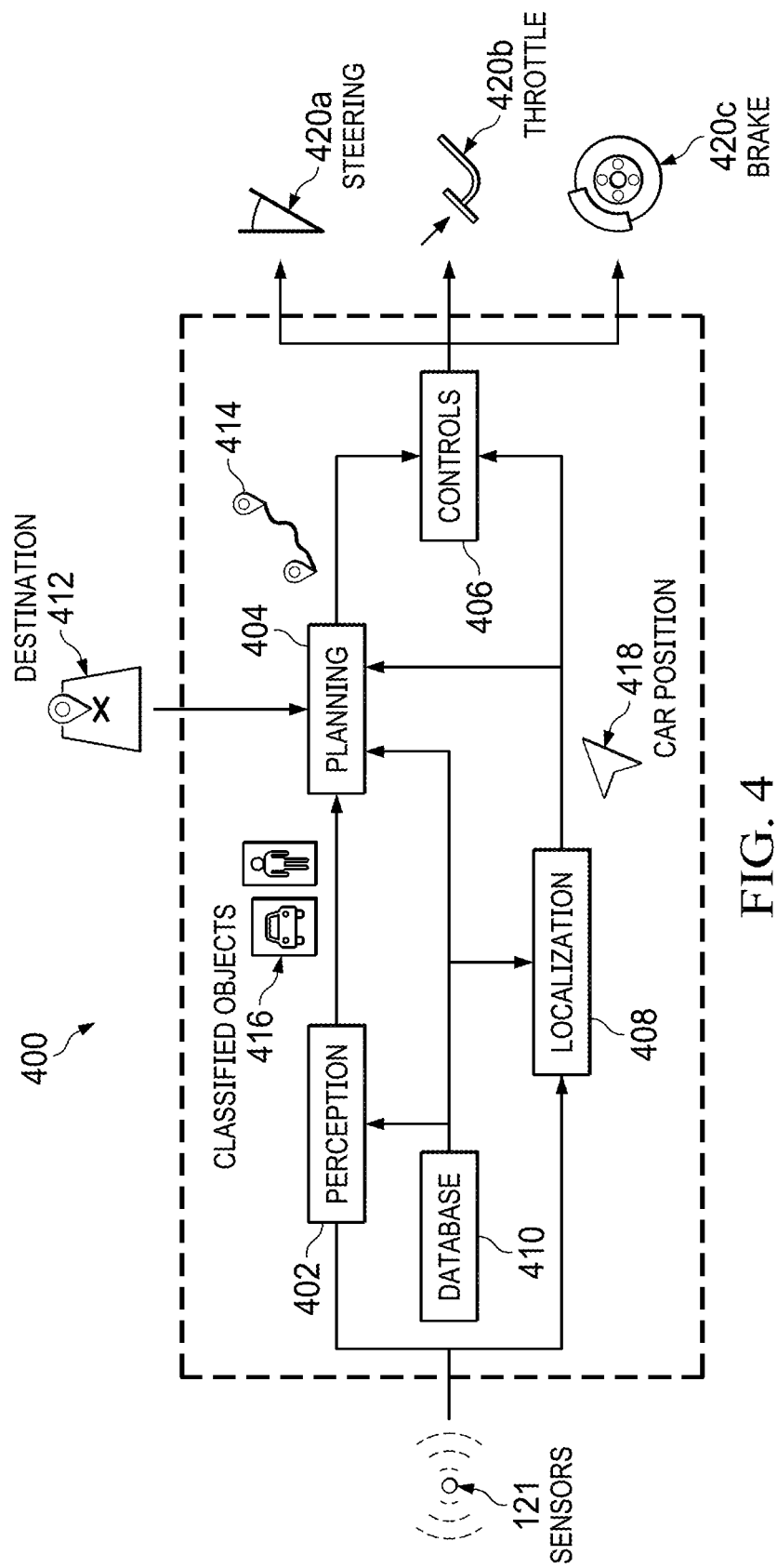
FIG. 4 shows an example architecture for an AV, in accordance with one or more embodiments.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Operation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Using a Machine Learning Model Trained with Reasonable Crowd Data to Score Trajectories Associated with a Traffic Scenario As previously described, an AV can traverse a given traffic scenario in different ways. It is desired, however, to choose the "best" trajectory for an AV to traverse the traffic scenario. The embodiments described below use an ML model to predict reasonableness scores for AV trajectories in an interpretable way. In an embodiment, the reasonableness scores are real numbers and the higher the score, the more reasonable the trajectory. Human annotations inform the parameters of the model. To achieve interpretability, in an embodiment rulebooks can be used to break down how the AV traverses a traffic scenario into human-understandable components that can be formally analyzed to assign the AV trajectory a reasonableness score. After the ML model is trained, the ML model can then be used during real-time operation of an AV to predict reasonableness scores for two or more trajectories for the AV to traverse the traffic scenario. The scores can be used to decide which trajectory the AV should choose to traverse a given traffic scenario. In this manner, one trajectory can be chosen over another because it is more "reasonable" according to reasonable crowd data.

Traffic Scenarios

Figure 5A:
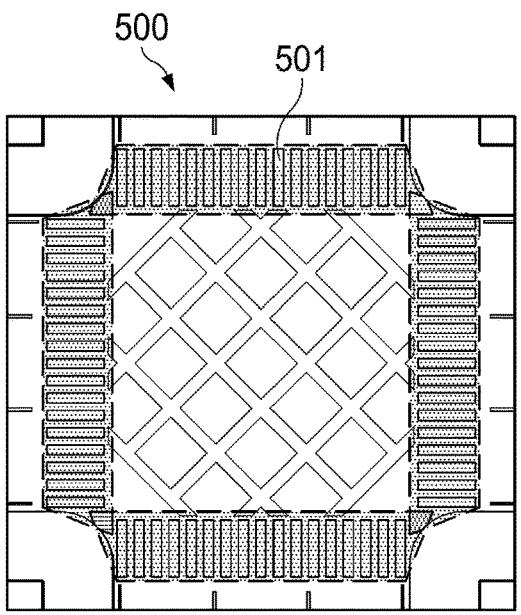
FIG. 5A is a map illustrating an intersection with lane markings and crosswalks, in accordance with one or more embodiments.

In an embodiment, a traffic scenario has the following relevant features:

Map M: a topology of the road network and the static environment (e.g., buildings, road markings). FIG. 5A is a map illustrating a topology that includes a street intersection 500 with lane markings and crosswalks 501.

Figure 5B:
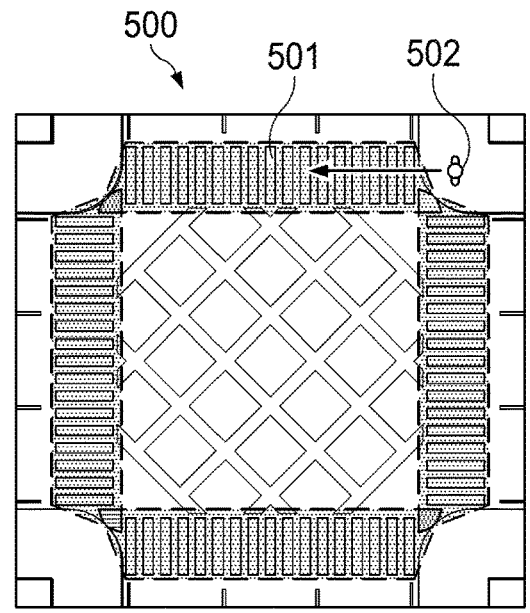
FIG. 5B is the map of FIG. 5A illustrating an example traffic scenario where a pedestrian is crossing the road at the intersection, in accordance with one or more embodiments.

Scenario b: The background of a traffic scenario, which is a map populated with other agents, their starting position and their trajectories. FIG. 5B illustrates an example traffic scenario where an agent 502 (a pedestrian) is about to enter crosswalk 501 at intersection. 500.

Trajectory t: The AV's trajectory in a given traffic scenario.

Figure 5C:
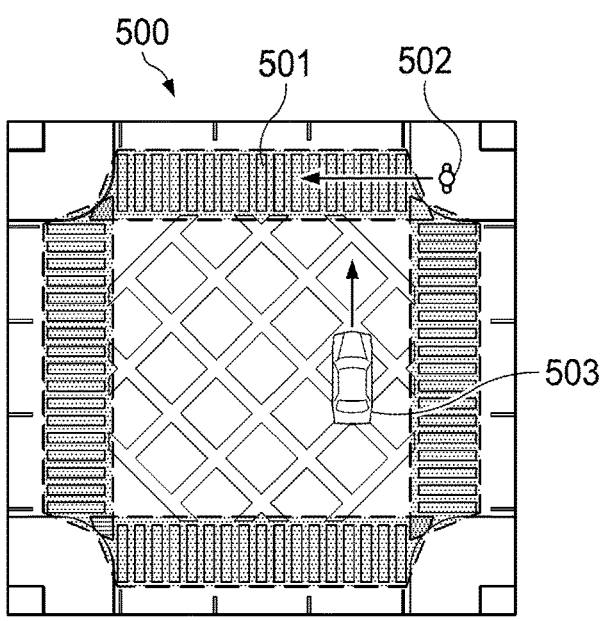
FIG. 5C is the map of FIG. 5B illustrating an example AV trajectory traversing the intersection, in accordance with one or more embodiments.

Realization w of scenario b, w∈$W_b$: a realization includes the traffic scenario and the AV's trajectory through it. FIG. 5C illustrates an example AV 503 traversing the intersection 500.

Annotations

Annotated data is needed to train an ML model. In an embodiment, the raw data to be annotated is a collection of traffic scenarios, $$B=\{b_1, \ldots, b_L\} \quad [1]$$

and a set of realizations associated with each of the traffic scenarios, $$W=\{W_{b_1}, \ldots, W_{bL}\}. \quad [2]$$

Human annotators are then shown a subset of these realizations and asked to rank them. Specifically, a ranking π is a permutation of a collection of realizations W:

$$(w_1, \ldots, w_m) \rightarrow (\pi(w_1), \ldots, \pi(w_m)), \quad [3]$$

where m∈$Z^+$ is the number of realizations to be ranked and π($w_i$) is the rank of realization $w_i$. π serves as the ground-truth data that ML model is trained on. Note that annotators are asked to rank or rate realizations because it is unrealistic to expect a human to provide an absolute score for a particular realization.

Pair-Wise Comparisons

To reduce the cognitive load on the human annotators, in an embodiment annotators are shown a pair of realizations and asked to choose the realization they think is most reasonable.

Formally, consider a set of m realizations $\{w_1, \ldots, w_m\}$. There are $$\binom{m}{2}$$

ways to pair m realizations. An annotator is shown such a pair on, for example, a computer screen, and asked to choose their preferred realization, such as, for example, the realization that is more reasonable. In an embodiment, the annotator's preference is encoded with the function h:

$$h(w_{i(k)}, w_{j(k)}) = \begin{cases} +1 & \text{if the annotator preferred } w_{i(k)} \text{ over } w_{j(k)} \\ -1 & \text{otherwise} \end{cases} \quad [4]$$

where $(w_{i(k)}, w_{j(k)})$ is the kth possible way to pair the m realizations, and i,j are integers between 1 and m. Other functions can be used to encode of the annotator's preference, or the preference can be used directly.

Note that the realization pairs are not constrained to come from the same traffic scenario. To increase data quality, however, the realization pairs can be constrained to come from the same scenario. Further, to account for noisy annotations, and the biases of the annotators, multiple human annotators can be asked to annotate the same pair of realizations $(w_{i(k)}, w_{j(k)})$. Further, note that given the encoding function h, the ground-truth data $\pi$ can be created by using stochastically transitive models, such as the Bradley-Terry model, described in Nihar B. Shah, Sivaraman Balakrishnan, Adityanand Guntuboyina, and Martin J. Wainwright. Stochastically Transitive Models for Pairwise Comparisons: *Statistical and Computational Issues*, 2015.

The realizations described above can be obtained in different ways. In an embodiment, a human subject sits in a vehicle that traverses the same real traffic situation in different ways. However, this is prohibitively expensive. In an alternative embodiment, a simulator is used that ingests a representation created by hand with a test case editor or created by an algorithm that simulates traffic. The simulator produces three-dimensional (3D) videos that are then shown to the human annotators.

Figure 6:
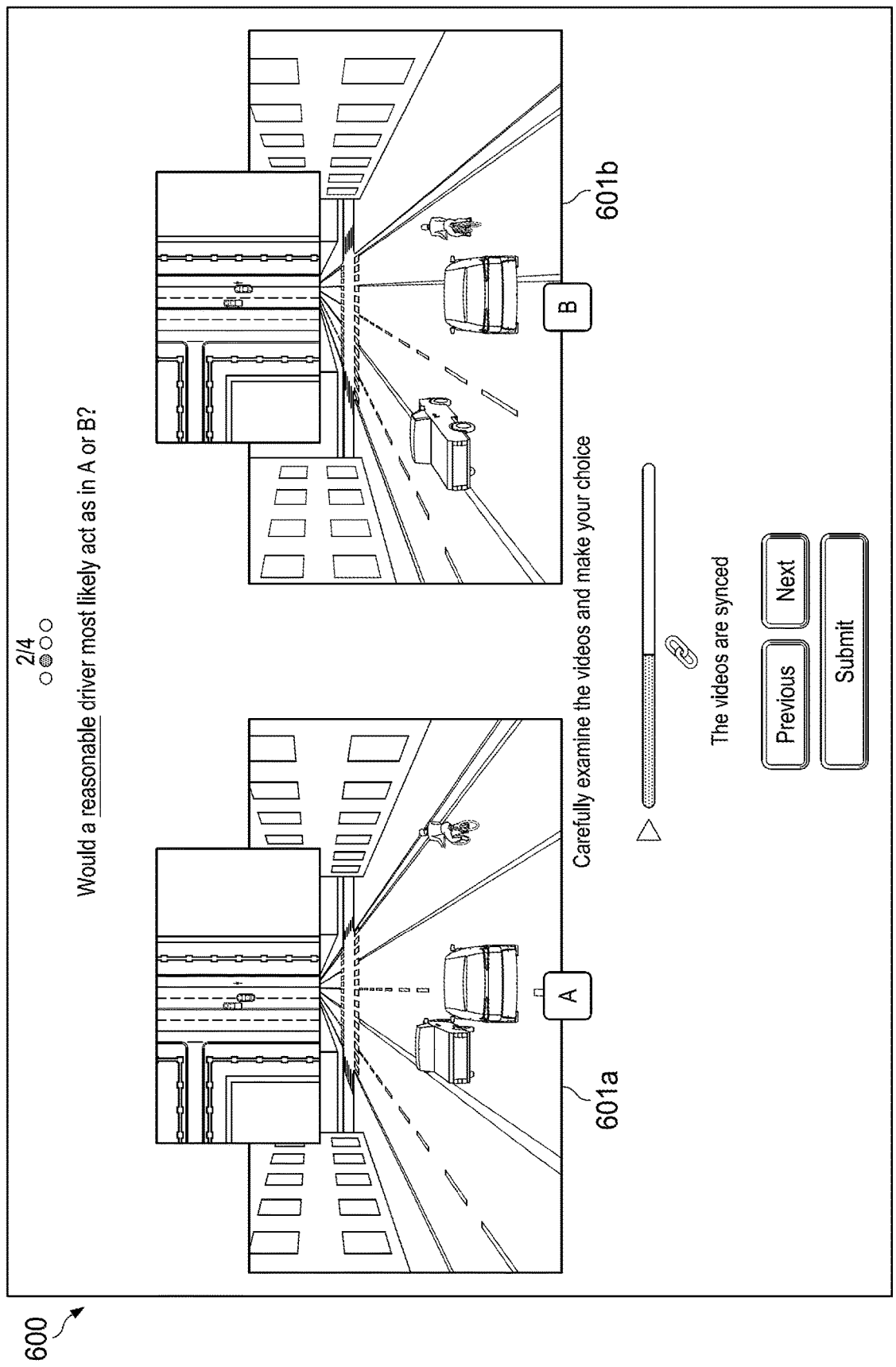
FIG. 6 is an example annotation tool interface for allowing human annotators to select a trajectory from a pair of trajectories, in accordance with one or more embodiments.

FIG. 6 is an example annotation tool interface 600 for allowing human annotators to select a trajectory from a pair of trajectories, in accordance with one or more embodiments. Other embodiments of tool interface 600 are also possible. In the example shown, the human annotator is show a video 601*a* (A) and a video 601*b* (B) presented side-by-side on, for example, a computer screen, with the instruction: "Would a reasonable driver most likely act as in A or B?" The interface 600 includes navigation controls, such as a play button that allows the annotator to replay the video. The annotator can click one of the video 601*a*, 601*b* to indicate their preference. The navigation controls also include graphical user interface (GUI) elements to allow the annotator to move backward and forward between different traffic scenarios.

Rulebooks

As previously defined above, a "rulebook" is a collection of traffic laws, rules of the road, and stakeholder requirements that are translated into mathematical rules:

$$r_i : W \rightarrow R, i=1 \ldots n, \quad [5]$$

where it is assumed that there are n rules, and R is a set of real numbers. The function $r_i(w)$ indicates the degree of violation or satisfaction of a particular rule by the AV in w. For example, $r_i(w)$ could indicate whether the AV remains on the road.

The rulebooks could also have a priority structure that encodes a belief about the relative importance of different rules. An example rulebook 700 with partial ordering is shown in FIG. 7. Notice that the safety of humans is prioritized over violating parking rules, and parking rules and stopping rules are of similar importance, where priority decreases from top to bottom. This partial-ordered structure can rank some trajectories (e.g., one in which a pedestrian is hit, and one in which the AV is parked illegally), but not all (e.g., such as one where a parked car is hit, and another trajectory where an animal is hit).

The ML Model—Setup

In an embodiment, a reasonableness scoring function s is defined that can assign reasonableness scores to arbitrary realizations:

$$s : W \rightarrow R, \quad [6]$$

such that $s(w_1) > s(w_2)$ if and only if a "reasonable human" would prefer $w_1$ over $w_2$, where $w_1$ and $w_2$ are two different realizations.

The function s could operate directly on a realization but to achieve interpretability its architecture could be constrained so that it first embeds the realization $w_s$ into a collection of rules taken from a rulebook, and then processes them using the ML model:

$$s(w) \approx s_{rules}(e_{rules}(w)), \quad [7]$$

where the rules embedding contains the output of the rulebook and is fully interpretable as:

$$e_{rules}(w) = (r_1(w) r_2(w) \ldots r_n(w))^T \in R^n. \quad [8]$$

The function $s_{rules}$ is a learned ML model that scores trajectories based on rule violations or satisfactions, and could, for example, be a fully-connected neural network or a decision tree. Note that there are some constraints on $s_{rules}$. Assuming that a greater $r_i(w)$ indicates a greater satisfaction of rule i then we have the constraint:

$$s_{rules}(e_{rules}(w) + \delta \alpha_i) > s_{rules}(e_{rules}(w)). \quad [9]$$

For $1 \leq i \leq n$, any w and $\delta$ are any positive real number. The variable $\alpha_i$ is the ith unit vector in n dimensions and is 0 everywhere except for its ith entry which is 1. Equation [9] states that if two realizations $w_1$ and $w_2$ are identical, except that $w_2$ violates a particular rule more, then $w_1$ must be more reasonable than $w_2$.

Figure 8:
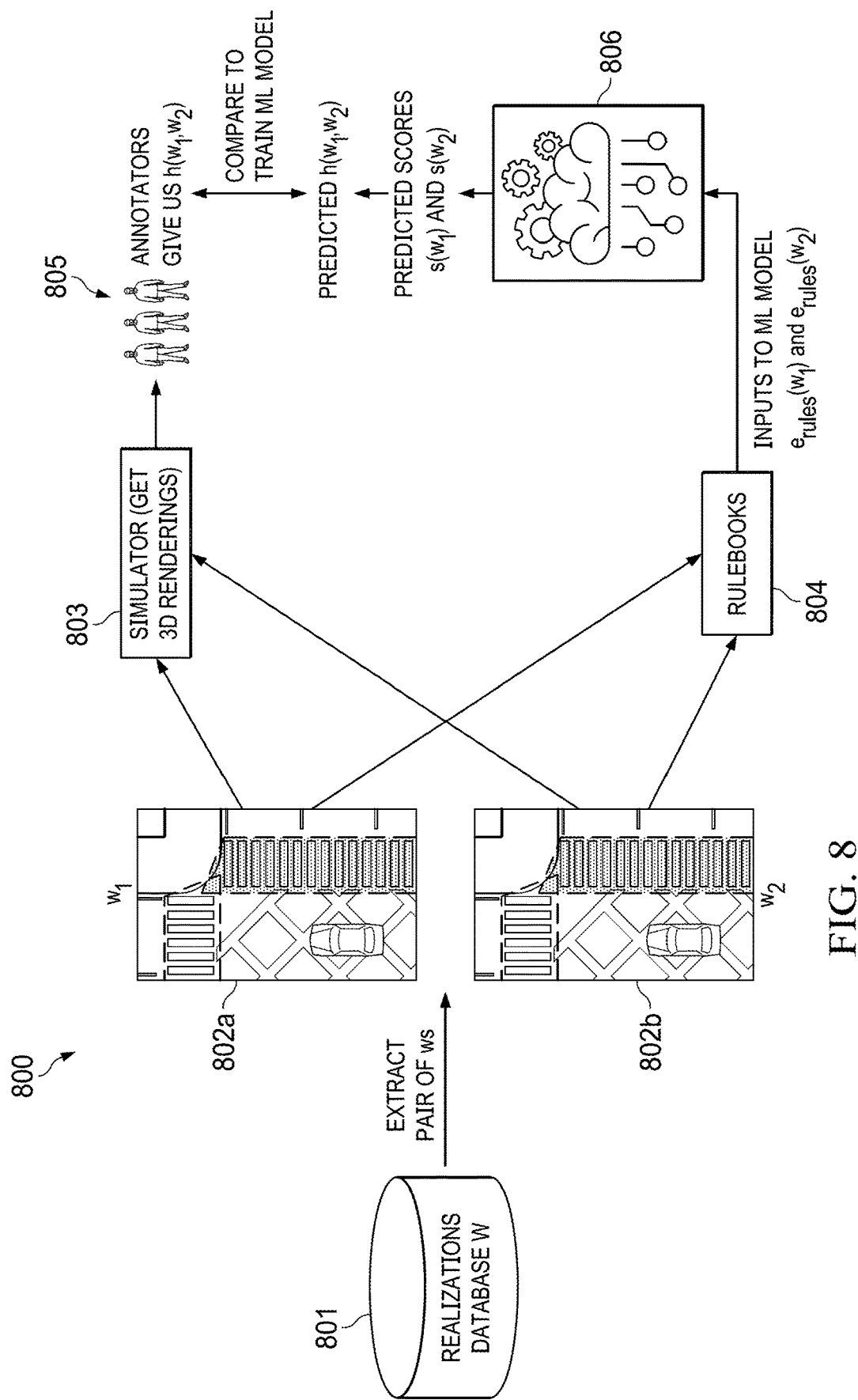
FIG. 8 illustrates a ML training procedure, in accordance with one or more embodiments.

FIG. 8 illustrates a ML training procedure 800, in accordance with one or more embodiments. In the example shown, a database 801 of realizations W is queried for a pair of realizations $(w_1, w_2)$. One or more rulebooks 1804 are then used to convert the realizations to $e_{rules}(w_1)$ and $e_{rules}(w_2)$, which are each a list/vector of scores indicating how well the AV adheres to different rules (e.g., traffic laws). The ML model 806 processes $e_{rules}(w_1)$ and $e_{rules}(w_2)$ and rates $w_1$ and $w_2$. If for example it rates $w_1$ higher than $w_2$, then the ML model 806 predicts that $w_1$ is more reasonable than $w_2$. The parameters of the ML model 806 are modified if this is not true, as determined by a plurality of human of annotators 805 that are shown 3D renderings 803 of $w_1$ and $w_2$, as described in reference to FIG. 6. Note that in other embodiments instead of annotating pairs of realizations, annotators can rank any number of trajectories against each other.

Tuning Model Parameters

ML model 806 has many parameters that need to be determined from training data. In particular, assume that our training data database includes K realization pairs and their associated labels, given by:

$$D=\{(x_k, y_k)\}, \quad [10]$$

$$x_k \equiv (u_k, v_k), \quad [11]$$

$$y_k \equiv h(u_k, v_k). \quad [12]$$

where $u_k$ and $v_k$ are realizations and $k=1 \ldots K$.

The learning problem is posed as a classification problem: given a pair of realizations $x=(u, v)$ and it's associated label $y=h(u, k)$, ML model 806 predicts whether the realization u is more reasonable than the realization v. In an embodiment, ML model 806 is run twice: once for each of $e_{rules}(u)$ and $e_{rules}(v)$, and generates two predictions: the reasonableness scores $s(u)$ and $s(v)$. A score differential is defined as $$d(x)=s(u)-s(v), \quad [13]$$

where ML model 806 is used to classify x in the following way:

$$\hat{y} = \begin{cases} +1 & \text{if } d(x) > 0 \\ -1 & \text{otherwise} \end{cases}. \quad [14]$$

The parameters of ML model 806 are then determined by minimizing the objective (loss) function:

$$\sum_{k=1}^{K} L(y_k, d(x_k)) + L_{reg} + L_{rb}. \quad [15]$$

where $L(y, d(x))$ penalizes the model if $y \neq \hat{y}$. The size of the penalty is determined by $d(x)$. $L_{reg}$ is a regularization term and can, for example, be an L1 or L2 regularization term. $L_{rb}$ penalizes predictions that violate a rulebook's structure:

$$L_{rb} = \lambda_{rb} \sum_{k=1}^{K} \max(0, -y_k^{rb} d(x_k)), \quad [16]$$

where $\lambda_{rb}$ is a positive scalar encoding the importance of $L_{rb}$ relative to the other loss terms, and $y_k^{rb}$ is the rulebook's prediction of whether the realization $u_k$ is preferable to $v_k$, $u_k$ and $v_k$ are the pair of realizations in the kth sample, where $k=1 \ldots K$ (so $y_k = h(u_k, v_k)$). Note that the rulebook cannot always compare two realizations, in which case $y_k$ is equal to $y_k^{rb}=0$. The rulebook can only compare two realizations if one of them violates a rule in a higher hierarchy level. Specifically, $$y_k^{rb} = \begin{cases} 1 & \text{rulebook predicts that } u_k \text{ is preferable to } v_k \\ -1 & \text{rulebook predicts that } u_k \text{ is preferable to } v_k \\ 0 & \text{otherwise} \end{cases} \quad [17]$$

Possible Loss Functions

In an embodiment, a hinge loss function can be used as the objective function. The hinge loss expects a clear margin between the samples with label $y=+1$ and the samples with label $y=-1$. The hinge loss function is given by:

$$L_{hinge}(y, d(x)) = \max(0, 1 - y \cdot d(x)), \quad [18]$$

where $d(x)$ is the differential score on input x. In another embodiment, a different loss function can be used that allows for slack, given by:

$$L_{slack}(y, d(x)) = \max(0, -1 - y \cdot d(x)). \quad [19]$$

In an embodiment, L1 or L2 losses, or a combination of L1 and L2 losses (smoothed L1 loss) can be used. For example, the L2 loss is given by:

$$L_{l2}(y, d(x)) = \max(0, -y \operatorname{sign}(d(x)) d(x)^2). \quad [20]$$

Regression Learning Embodiment

In an embodiment, ground-truth data are assigned to realizations by fitting stochastically transitive models to the annotators' preferences, as described in Nihar B. Shah, Sivaraman Balakrishnan, Adityanand Guntuboyina, and Martin J. Wainwright. Stochastically Transitive Models for Pairwise Comparisons: *Statistical and Computational Issues*, 2015.

This stochastically transitive models provide ground-truth regression targets for the samples $x_k = (u_k, v_k)$ where $k = 1 \ldots K$.

$$\tilde{d}_k = \tilde{s}_{u_k} - \tilde{s}_{v_k}, \quad [21]$$

where $\tilde{s}_{u_k}$ is the ground-truth score assigned to the realization u. The parameter $d(x_k)$ is then compared directly to $\tilde{d}_k$, and regression losses, such as the L2 regression loss $(d(x_k) - \tilde{d}_k)^2$ are used. Alternatively, $s(u)$ can be compared directly to $\tilde{s}_{u_k}$.

Example Architectures

There are a wide variety of ML models that can be employed in the disclosed embodiments. Artificial neural networks are especially popular, and in practice do very well. However, for simplicity Linear Support Vector Machines (linear SVM) can be used. The Linear SVM is also easier to interpret. Other models, include but are not limited to regression analysis, Bayesian prediction, multi-layer perceptron and genetic programming.

In an embodiment, a linear SVM, $f_{SVM}$, assigns a weight to each rule in a rulebook. A larger weight indicates a more important rule. The linear SVM then rates a realization w with rule scores $e_{rules}(w)$ in the following way:

$$f_{SVM}(e_{rules}(w)) = \alpha \cdot e_{rules}(w), \quad [22]$$

where $\alpha \in R^n$, and for simplicity the bias term is omitted.

For an input $x=(u, v)$, the differential score is given by:

$$d(x) = \alpha \cdot e_{rules}(u) - \alpha \cdot e_{rules}(v) \quad [24]$$

$$= \alpha \cdot (e_{rules}(u) - e_{rules}(v)).$$

Consequently, a linear SVM can be trained on a datum (x, y) by running it once instead of twice. The rules differential are provided as $(e_{rules}(u) - e_{rules}(v))$. Linear SVMs employ the hinge loss shown in Equation [18], and for linear SVMs the L2 regularization term is of the form $\lambda \alpha \cdot \alpha$ where $\lambda \in R$.

Alternative Embeddings

Although traffic laws strongly influence a driver's behavior, they are not the only factors that determine their behavior. Other factors, such as the behavior of other agents and how occluded a driver's view is also play a role. On their own, the traffic laws do not contain enough information to always understand annotators' preferences for what constitutes reasonable behavior. Even if the rules were extended to include behavior that is not encoded in the laws (e.g, a rule that penalizes oscillatory trajectories), a given set of rules may not include all relevant factors.

Figure 9:
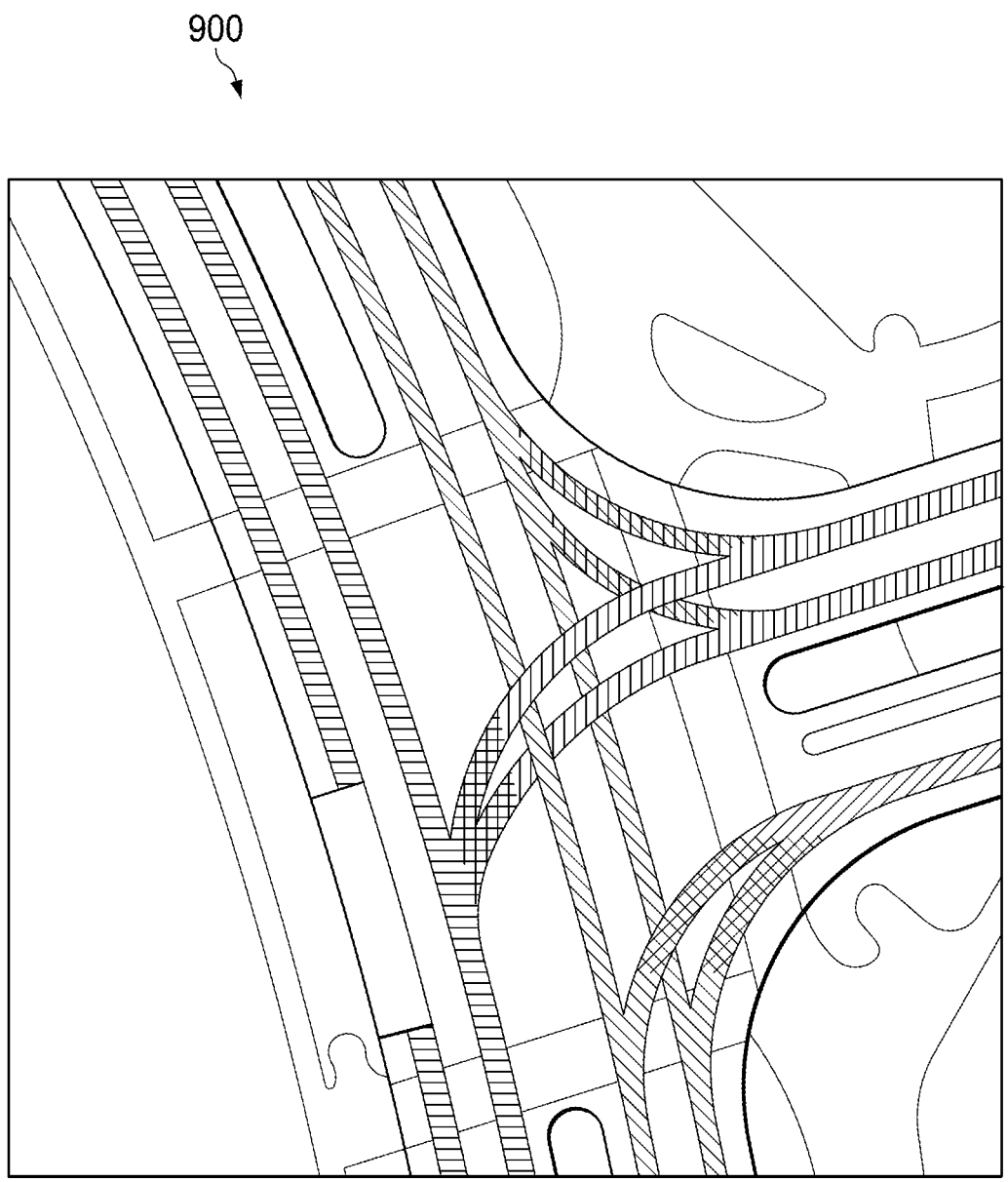
FIG. 9 illustrates an example bird's eye view (BEV) embedding (pseudo-image) of a traffic scenario to be used as training data for a neural network, in accordance with one or more embodiments.

FIG. 9 illustrates an example bird's eye view (BEV) embedding 900 of a traffic scenario to be used as training data for a neural network, in accordance with one or more embodiments. In an embodiment, more information is captured in a particular scene by embedding many relevant aspects of the scene into a BEV pseudo-image, as is commonly used in the behavior prediction literature. Such an embedding could be, for example, a function:

$$e_{img}: W \to R^{C \times H \times W}, \quad [25]$$

that maps a scenario to a pseudo-image of height H, width W and C channels. For example in the pseudo RGB image shown in FIG. 8, C=3 and includes the drivable area 901, cross walks 902, etc. The scoring function that is learned would operate on the embedding $e_{img}$ (w) instead of $e_{rules}$ (w), and Equation [7] is replaced with:

$$s(w) \approx s_{img}(e_{img}(w)). \quad [26]$$

Thus, embedding realizations in pseudo-images provides an alternative reasonableness scoring method to compare against, inform and validate, the rule embedding. For example, a large performance gap between a ML model based on a learned embedding versus one based on the rule embedding suggests relevant rules may be missing.

Note that in an embodiment $s_{img}$ can be a Convolutional Neural Network (CNN), as the computer vision community has shown their superior effectiveness on pseudo-images. The CNN used could, for example, be a residual network, as described in Kaiming He, Xiangyu Zhang, Shaoqing Ren, and Jian Sun. Deep residual learning for image recognition, 2015. Or, alternatively, the VGG network described in Karen Simonyan and Andrew Zisserman. Very Deep Convolutional Networks for Large-Scale Image Recognition, 2014.

In other embodiments, other types of embeddings can be used, such as vector embeddings that operate directly on a vector representation of the trajectories. Vector embeddings are described in Jiyang Gao et al. VectorNet: Encoding HD Maps and Agent Dynamics from Vectorized Representation.arXiv:2005.04259v1 [cs.CV].

Additional User Cases

A. Evaluating Planner Performance

In an embodiment, the techniques described can be used to tune a route planner and its performance. Given a collection of L traffic scenarios $$\beta = \{b_1, \ldots, b_L\}. \quad [27]$$

A route planner is run on each scenario. The route planner uses a trained ML model as described above to predict a trajectory for each of the L traffic scenarios:

$$\{W_1, \ldots, W_L\}. \quad [28]$$

The ML model rates each of the trajectories, resulting in L scores:

$$\mathcal{S} = \{s_1, \ldots s_L\}. \quad [29]$$

A metric can be formed for the planner from these scores. For example, the metric could be the average of the scores:

$$\text{metric} = \frac{1}{L}\sum_{i=1}^{L} s_i. \quad [30]$$

Additionally, the scores can help fine tune the planner by identifying which scenarios the planner performed badly on. The parameters or design of the planner can then be changed to address the inadequate performance.

B. Comparing Two AV Stacks

In an embodiment, the reasonable-crowd score provides a way to compare the performance of two AV software stacks. The AV software stacks could differ in one or more subsystem implementations (e.g., the planner and/or the object detector). In embodiment, the metric of Equation [30] is used to compare the performance of the AV software stacks.

C. Reinforcement Learning

In an embodiment, the trained ML model described above is used as a reward function in a reinforcement learning algorithm. In in real-world robotics, designing a good reward function is crucial for obtaining reasonable behavior.

Example Processes

Figure 10:
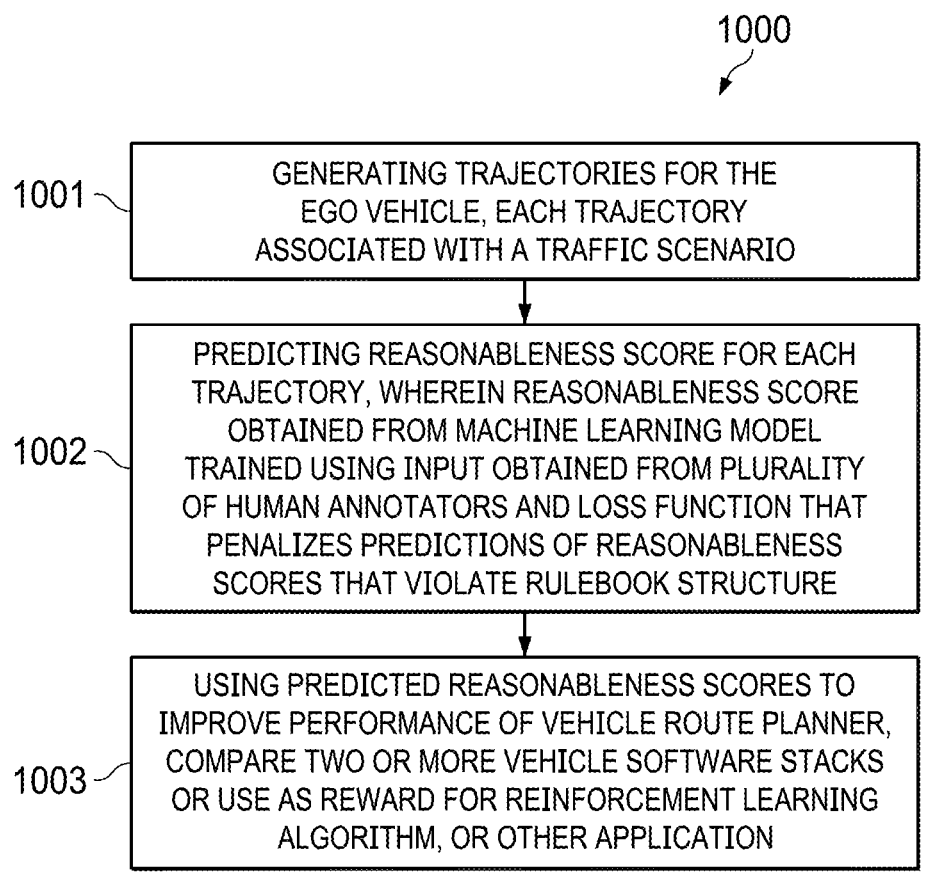
FIG. 10 is a flow diagram of a process of using a ML model to predict a reasonableness score for an AV trajectory, in accordance with one or more embodiments.

FIG. 10 is a flow diagram of a process 1000 of using a ML model to predict a reasonableness score for an AV trajectory during real-time operation of the AV, in accordance with one or more embodiments. Process 1000 can be implemented, for example, by the computer system 300 described in reference to FIG. 3.

Process 1000 begins by generating a set of trajectories for the AV, where each trajectory is associated with a traffic scenario (1001). For example, a planning module 404 of the AV can generate multiple candidate trajectories for a traffic scenario, each of which satisfies the rules in a rulebook.

Process 1000 continues by predicting a reasonableness score for each trajectory, wherein the reasonableness score is obtained from a machine learning model that is trained using input obtained from a plurality of human annotators and a loss function that penalizes predictions of reasonableness scores that violate a rulebook structure (1002). For example, an ML model trained to predict reasonableness scores can be trained with sets of rulebook scores generated by embedding pairs of realizations into the rules of a rulebook, where the set of scores indicate or correspond to how well a particular realization adheres to the rules (i.e., violates or satisfies the rules).

Process 1000 continues by using the predicted reasonableness scores to improve the performance of a vehicle route planner, to compare two or more vehicle software stacks, as a reward for a reinforcement learning algorithm or used by any other application that could benefit from a machine learning model that scores vehicle trajectories (1003). For example, the planning module 404 can use the predicted reasonableness scores to select the most reasonable trajectory to be used by the AV to traverse a traffic scenario, i.e., avoid collision with pedestrian 502.

Figure 11:
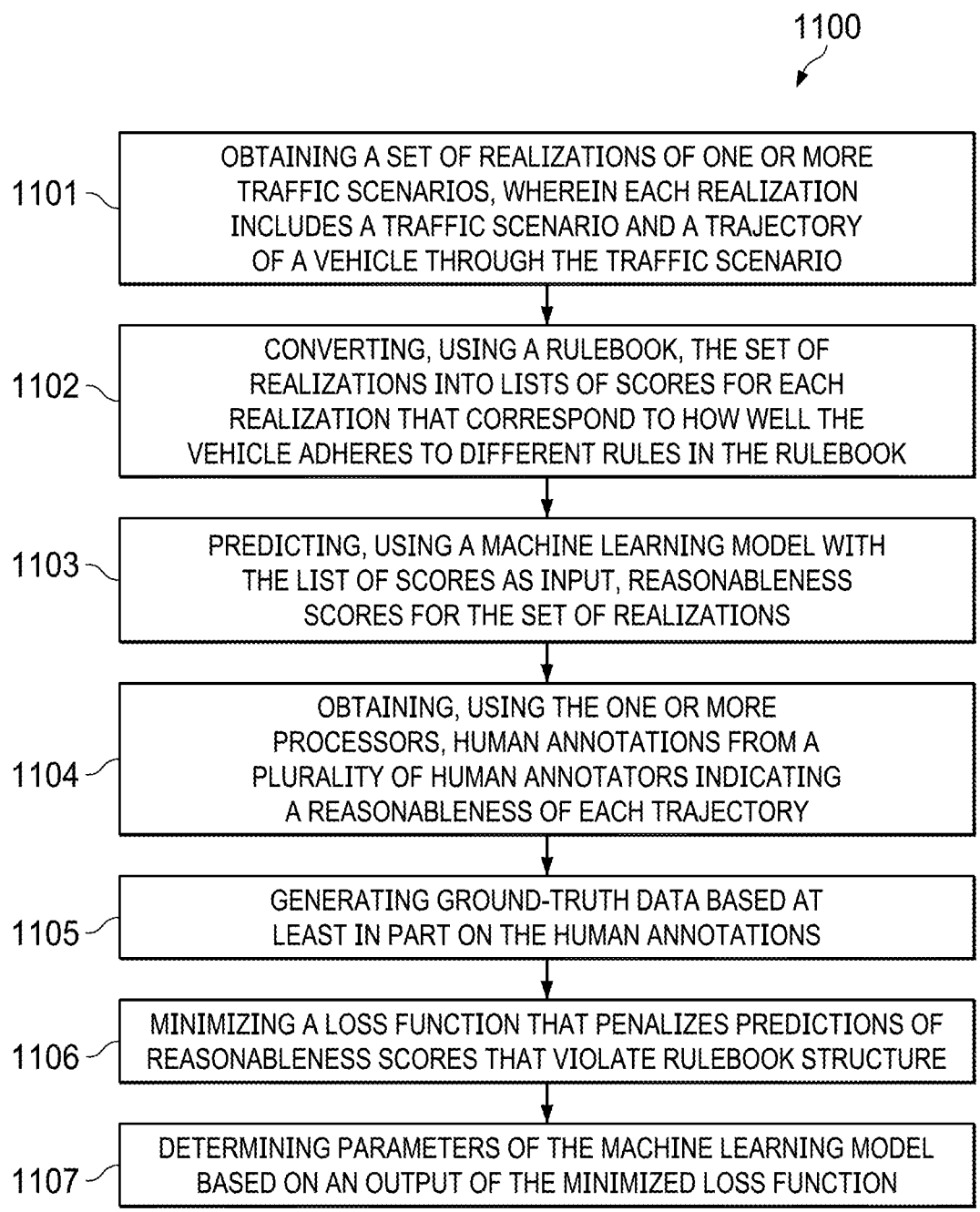
FIG. 11 is a flow diagram of a process of training an ML model to predict a reasonableness score for an AV trajectory, in accordance with one or more embodiments.

FIG. 11 is a flow diagram of a process 1100 of training an ML model to predict a reasonableness score for an AV trajectory, in accordance with one or more embodiments. Process 1100 can be implemented, for example, by the computer system 300 described in reference to FIG. 3.

Process 1100 begins by obtaining a set of realizations of one or more traffic scenarios, wherein each realization includes a traffic scenario and a trajectory of a vehicle traversing the traffic scenario (1101). In an embodiment, a human subject sits in a vehicle that traverses the same real traffic situation in different ways. In an alternative embodiment, a simulator is used that ingests a representation created by hand with a test case editor or created by an algorithm that simulates traffic. The simulator produces 3D videos that are then presented to the human annotators on a display, such as a computer display.

Process 1100 continues by converting, using a rulebook, the set of realizations into a set of scores for each realization that correspond to how well the trajectory adheres to different rules in the rulebook (1102). In an embodiment, the realizations are embedded into a collection of rules taken from a rulebook, where the rulebook includes a collection of traffic laws, rules of the road and stakeholder requirements that are translated into precise mathematical rules. There is a set of scores for each realization, where each particular score in the set indicates how well the trajectory adhered to a particular corresponding rule. In an embodiment, a planning module would add all the scores for each trajectory, and the trajectory with the highest total score would be selected as the "best" trajectory for the AV for the particular traffic scenario. However, if there are multiple candidate trajectories available that have identical scores, then reasonable scores can be looked at to help select the most reasonable trajectory, as described in the next process step.

Process 1100 continues by predicting, using a machine learning model with the set of scores as input, reasonableness scores for the set of realizations (1103). The machine learning model can be any model that can be trained to predict reasonableness scores, including but not limited to a linear SVM, or if the realizations are embedded in a pseudo-image, then a CNN, for example.

Process 1100 continues by obtaining annotations from a plurality of human annotators indicating a reasonableness of each realization (1104). For example, pairs of realizations can be rendered into two-dimensional (2D) or 3D videos and presented to a plurality of annotators, as described in reference to FIG. 6. The annotators are asked to choose the realization of the pair they think is most reasonable. The pair of realizations can include the same traffic scenario or different traffic scenarios.

Process 1100 continues by generating ground-truth data based at least in part on the annotations (1105). For example, the annotations can be encoded by a function that outputs a first value (e.g., +1) if the annotator preferred a first realization, and another value otherwise (e.g., −1). The function can then be used to create ground-truth data using, for example, stochastically transitive models, such as the Bradley-Terry model.

Process 1100 continues by minimizing a loss function of the ground-truth data and predicted reasonableness scores, wherein the loss function penalizes predictions of reasonableness scores that violate the rulebook structure (1106). In an embodiment, a hinge loss function can be used as the objective function. In another example, a loss function allows for slack can be used. In yet another embodiment, L1 or L2 losses, or a combination of L1 and L2 losses (smoothed L1 loss) can be used.

Process 1100 continues by determining parameters of the machine learning model based on an output of the minimized loss function (1107). For example, a differential reasonableness score can be minimized.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

What is claimed is:

1. A method comprising:
   augmenting, using one or more processors, a route planner of a first vehicle using predicted reasonableness scores for trajectories, wherein reasonableness scores are predicted by a trained machine learning model with parameters determined using a loss function that penalizes predictions of reasonableness scores that violate a rulebook structure;
   planning, using the one or more processors, trajectories in an environment using the augmented route planner;
   identifying, using the one or more processors, at least one trajectory with inadequate performance by the augmented route planner based on a first metric associated with the predicted reasonableness scores; and
   changing, using the one or more processors, parameters of the augmented route planner in response to the identified at least one trajectory.

2. The method of claim 1, wherein the trained machine learning model is trained using input obtained from a plurality of human annotators.

3. The method of claim 1, further comprising:
   obtaining a second metric associated with reasonableness scores associated with a second vehicle; and
   comparing the first metric and the second metric, wherein the comparison represents a comparison of performance of the first vehicle and the second vehicle.

4. The method of claim 1, comprising operating the first vehicle along a planned trajectory output by the augmented route planner with changed parameters.

5. The method of claim 1, wherein the loss function is a hinge or slack loss function.

6. The method of claim 1, wherein the trained machine learning model is a linear support vector machine.

7. The method of claim 1, wherein the trained machine learning model is a neural network.

8. At least one non-transitory storage media storing instructions that, when executed by at least one processor, cause the at least one processor to:
   augment a route planner of a first vehicle using predicted reasonableness scores for trajectories, wherein reasonableness scores are predicted by a trained machine learning model with parameters determined using a loss function that penalizes predictions of reasonableness scores that violate a rulebook structure;
   plan trajectories in an environment using the augmented route planner;
   identify at least one trajectory with inadequate performance by the augmented route planner based on a first metric associated with the predicted reasonableness scores; and
   change parameters of the augmented route planner in response to the identified at least one trajectory.

9. The at least one non-transitory storage media of claim 8, wherein the trained machine learning model is trained using input obtained from a plurality of human annotators.

10. The at least one non-transitory storage media of claim 8, wherein the instructions further cause the at least one processor to:
    obtain a second metric associated with reasonableness scores associated with a second vehicle; and
    compare the first metric and the second metric, wherein the comparison represents a comparison of performance of the first vehicle and the second vehicle.

11. The at least one non-transitory storage media of claim 8, wherein the instructions further cause the at least one processor to operate the vehicle along a planned trajectory output by the augmented route planner with changed parameters.

12. The at least one non-transitory storage media of claim 8, wherein the loss function is a hinge or slack loss function.

13. The at least one non-transitory storage media of claim 8, wherein the trained machine learning model is a linear support vector machine.

14. The at least one non-transitory storage media of claim 8, wherein the trained machine learning model is a neural network.

15. A system, comprising:
at least one processor, and
at least one non-transitory storage media storing instructions that, when executed by the at least one processor, cause the at least one processor to:
augment a route planner of a first vehicle using predicted reasonableness scores for trajectories, wherein reasonableness scores are predicted by a trained machine learning model with parameters determined using a loss function that penalizes predictions of reasonableness scores that violate a rulebook structure;
plan trajectories in an environment using the augmented route planner;
identify at least one trajectory with inadequate performance by the augmented route planner based on a first metric associated with the predicted reasonableness scores; and
change parameters of the augmented route planner in response to the identified at least one trajectory.

16. The system of claim 15, wherein the trained machine learning model is trained using input obtained from a plurality of human annotators.

17. The system of claim 15, wherein the instructions further cause the at least one processor to:
obtain a second metric associated with reasonableness scores associated with a second vehicle; and
compare the first metric and the second metric, wherein the comparison represents a comparison of performance of the first vehicle and the second vehicle.

18. The system of claim 15, wherein the instructions further cause the at least one processor to operate the vehicle along a planned trajectory output by the augmented route planner with changed parameters.

19. The system of claim 15, wherein the loss function is a hinge or slack loss function.

20. The system of claim 15, wherein the trained machine learning model is a linear support vector machine.

21. The system of claim 15, wherein the trained machine learning model is a neural network.

* * * * *